United States Patent Office 3,057,207
Patented Oct. 9, 1962

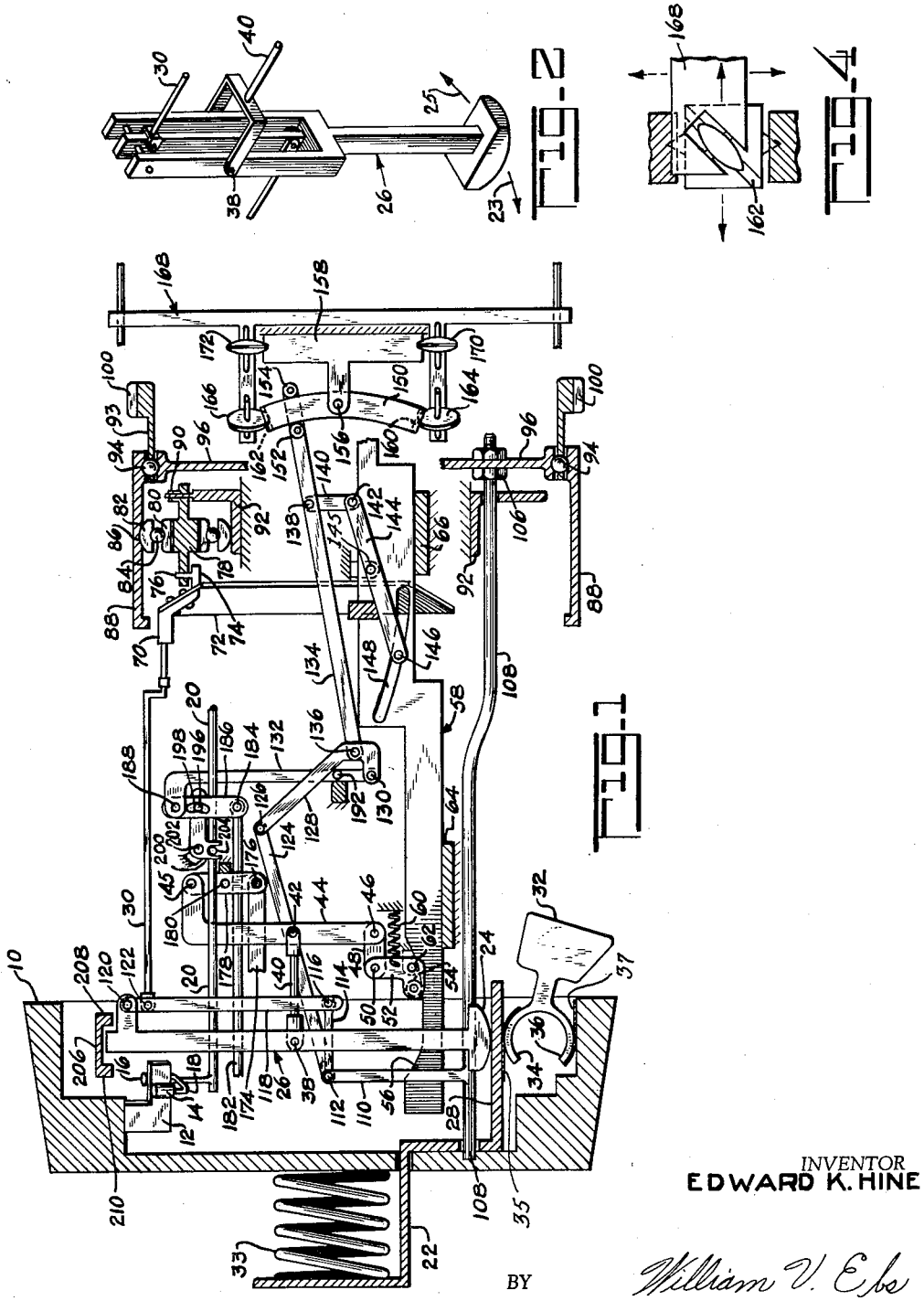

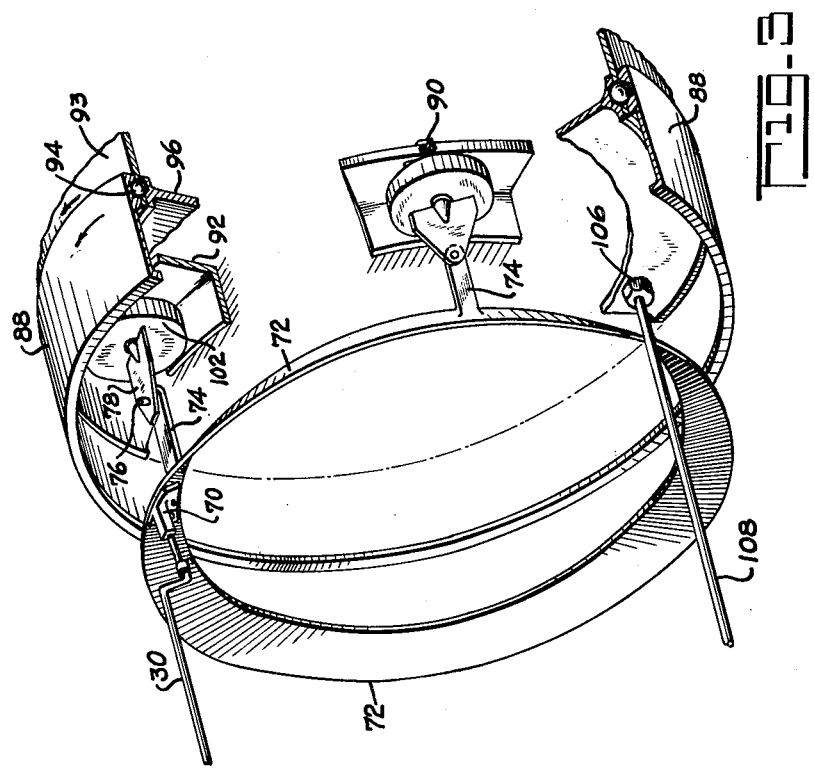

3,057,207
MECHANICAL SPEED CONTROL
Edward K. Hine, North Caldwell, N.J., assignor to Curtiss-Wright Corporation, a corporation of Delaware
Filed July 1, 1959, Ser. No. 824,274
9 Claims. (Cl. 73—512)

My invention is directed to a novel and improved mechanical arrangement for controlling the speed of an engine.

The device of the invention is rotated by the engine to be controlled, and according to such rotation generates rate of change of speed and instantaneous speed error signals which when integrated may be used to provide an integral plus proportional type of speed governing. These signals are summed and amplified to provide a control signal for regulating speed in the desired manner. The mechanism of the invention finds particular application in control systems for aircraft propellers, and is preferably adapted to respond to phase control signals in such a way that the mechanism may be used as, for example, in the control system described in the co-pending application of Charles W. Chillson for a Multi-Powerplant Synchronizing System, Serial No. 644,315, filed March 6, 1957, to facilitate the phase synchronization of several propellers as well as control their speed.

An object of the invention is to provide a device of the described type for controlling engine speed, the output of which is subject to continuous modification according to changing dynamic requirements of the engine and engine driven members so as to provide optimum control response.

Another object of the invention is to provide such a device, the operation of which is controlled to prevent overspeeding of underspeeding of the engine being regulated due to a sudden change in the speed setting of the device.

Various other objects and advantages of the device of the invention will be mentioned hereinafter and still others will become obvious during a reading of the specification.

Referring to the drawings wherein similar reference characters refer to similar parts in the several views:

FIG. 1 is a diagrammatic view showing the device of the invention,

FIG. 2 is a perspective view of a summing differrential found in the device,

FIG. 3 is a perspective view of a signal amplifier, also part of the device shown in FIG. 1, FIG. 4 is a top plan of an output element of the device.

It is intended that the regulating device, as shown in FIG. 1, be housed in a rotatable structure connected to the engine to be controlled and that the device and housing be rotated at the speed of the engine or at some speed proportional thereto, the housing being adapted to permit the parts of the device to move relative thereto to accomplish the control functions of the invention. For the most part the housing has been omitted from the drawings in the interest of clarity. Any parts hereinafter referred to as being fixed should be considered as being fixed only with reference to the housing, it being understood that they actually rotate at housing speed.

In FIG. 1 of the drawing reference character 10 denotes a flywheel. Secured to the flywheel at evenly spaced locations therearound are a number of depending springs 12 only one of which appears in the drawing. These springs 12 are L-shaped as shown. The horizontal leg of each of the springs 12 is embraced by a pair of rollers 14 and 16 mounted on a yoke 18 which is affixed to a movable rod 20. The flywheel 10 is rotated by the engine to be controlled as through the rod 20, the rollers 14 and 16, and springs 12, the rollers nevertheless being adjustable horizontally by rod 20 on the horizontal legs of springs 12. Because of the resiliency of spring 12 the flywheel 10 moves relative to the rollers 14 and 16, rod 20 and the driving unit, whenever a change in speed of the driving unit occurs. The extent of the relative movement is directly proportional to the rate of change of speed, the proportionality factor being determined according to the horizontal setting of rod 20.

The flywheel 10 includes a collar 22 which is mounted to rotate with the flywheel but is movable axially relative thereto. The cylindrical surface 24 at one end of a differential 26 rests upon the inside surface 28 of this collar 22. The movement of flywheel 10 resulting from a rate of change in speed imparts a similar movement to the differential 26 by reason of the contact between the collar and differential on surfaces 28 and 24 respectively. Reference may be made to FIG. 2, which more closely depicts the actual structure of differential 26 than FIG. 1, for a showing of the directions, indicated by arrows 23 and 25, in which the lower end of the differential is moved by the collar 22 as a result of a speed change. The differential tilts to move member 30 connected at the upper end thereof an amount proportional to the rate of change of speed.

Mounted around the collar 22 and between the collar and flywheel 10 are a number of flyweights 32, one of which appears in the drawing. The flyweights include cylindrical arms 34 and 36 which are tied to the collar 28 and flywheel 10 respectively by flexible straps 35 and 37. The position of the flyweights is determined in accordance with their speed of rotation. When their speed of rotation is increased due to an increase in speed of the engine the weights are caused to move outwardly from the axis of rotation and impart a rightward translational movement as viewed in FIG. 1 to the collar 22 against the bias of spring 33. This movement of the collar causes the differential 26 to pivot in a counterclockwise direction about pivotal point 38. A decrease in speed causes the flyweights to move inwardly such that the collar 23 is moved to the left and differential 26 is moved in a clockwise direction about pivotal point 38. This movement of the differential, due to the weights 32, is reflected at the upward end of the differential causing the output differential member 30 to move to the right or left.

The positioning of the output member 30 by the weights 32 is dependent upon set speed, that is a desired speed for the engine to be controlled by the device of the invention as well as the actual speed of the controlled unit at any particular time. The device provides for an adjustment of the pivotal point 38 of the differential in accordance with such set speed. As shown in FIG. 1, the differential connects through the pivotal point 38 to a rod 40, this rod in turn being pivotally connected at 42 to a link 44. The link 44 pivotally connects at 46 to a link 48, and the link 48 pivotally connects at 50 to a link 52. Link 52 has a cam follower 54 mounted thereon at one end which is maintained in contact with the cam surface 56 of a speed scheduler 58 by means of a spring 60 which biases the link 52 in a counterclockwise direction about a fixed pivotal point 62. The scheduler 58 is positionable horizontally, being slideable relative to housing members 64 and 66 according to a desired speed for the engine. The position of the cam follower 54, links 52, 48, 44, rod 40 and the pivotal point 38, is dependent upon the position of the scheduler, link 44 being pivoted at 45 such that the pivotal point 38 is moved to the right or left as the scheduler is moved to cause the cam follower to ride up or down respectively on the cam surface 56. Although, as shown in the drawing, the scheduler may be moved in either direction from a position in which the cam follower is on the low point on cam surface 56 to change set speed, it may be convenient to establish such position as a limiting position for the scheduler such that the scheduler may be moved in only one direction toward this position and only in the opposite direction away from such position. The positioning of the rod 30 by the flyweights 32 and scheduler is in accordance with the difference between the desired speed and the actual speed of the engine.

The differential output member 30 connects by way of rod 68 and attached member 70 to a conical ring 72 constituting the input element of a power amplifier. As indicated hereinbefore, the differential 26 and therefore output member 30 are moved rotationally in accordance with the rate of change of speed and such movement is imparted through the rod 68 and member 70 to the conical ring 72. As stated, the rod 30 is also subject to being moved to the right or left as viewed in FIG. 1 according to speed and any such movement is also imparted to the conical ring 72. Movement of the rod 30 to the right or left imparts a rotational component of motion to the ring 72 inasmuch as member 70 is disposed at an angle to the direction of movement of the rod 30. The ring 72 has a number of projecting fingers 74 thereon pivotally connecting at 76 to a member 78 which rotationally supports races 80 and 82 containing the balls 84. The race 82 preferably has an outer spherical surface 86 which contacts the inner surface of a cylindrical ring 88. The member 78 is pivotally connected at 90 to housing structure 92. A race 93 carrying balls 94 in contact with the cylindrical ring 88 and output ring 96 is provided to rotate the ring member 88. The race 93 is provided at 100 with gear teeth for connecting the race to driving mechanism, not shown, by means of which the race may be rotated at some speed relative to the housing. The output ring 96 is mounted for motion to the right or left as viewed in FIG. 1, but is prevented from rotating relative to the housing.

The operation of the signal amplifier may be best understood by referring to FIG. 3 showing the parts in perspective wherein the members 80, 82 and 84 are consolidated and shown as a wheel 102 to simplify the illustration, the operation of the amplifier unit, however, being unchanged. When the conical ring 72 is rotated by the input signals thereto the ring acting through the fingers 74 and member 78, pivots member 78 about pivotal mounting 90 to change the orientation of the axis of rotation of the wheel 102 (FIG. 3) or the races 80 and 82 and the balls 84 (FIG. 1). The ring 88, which is continuously rotated by the member 93 acting through the balls 94 is free to move horizontally and is caused to do so when the rotational axis of the races 80 and 82 and balls 84, is skewed with respect to the rotational axis of member 88. The clockwise rotation as viewed in FIG. 3 of the axis of the wheel 102 or the equivalent races 80 and 82 and the balls 84 (shown in FIG. 1), causes the member 88 to move to the right whereas counterclockwise rotation of these axes causes the member 88 to be moved to the left. Output member 96 while restrained from rotation moves to the right or left with member 88.

The member 96 is secured at 106 to a movable rod 108 which includes an integral link 110. Rotational movement of the rod 108 and member 96 is prevented by engagement of the rod with collar 22. The rod 108 does, however, move horizontally with member 96. Rod 108 is moved in accordance with the output signal from the signal amplifier which signal is a power amplified version of the amplifier input signal. Integral link 110 is pivotally connected at 112 to another link which in turn is pivotally connected at 116 to a link 118. The link 118 constitutes a portion of the differential 26, being connected to the main structure at 120. Link 118 pivotally connects at 122 with the rod 30 to complete a connection for a feedback signal from output member 96 of the signal amplifier to the input member 30 of the amplifier by way of links 108, 110, 114 and 118. The feedback discontinues effective operation of the signal amplifier when the feedback signal matches the input signal to the amplifier. As shown the link 110 pivotally connects at 112 with the link 124 which in turn pivotally connects at 126 with the link 128. Link 128 pivotally connects at 130 with another link 132. From the standpoint of obtaining desired speed control link 128 may be considered to be rotatable about pivotal point 130. The link 128 has another link 134 pivotally connected to it at 136. The link 134 is moved through the described interconnecting links in accordance with the output of the signal amplifier.

Link 134 is pivotally connected at 138 to a link 140 which in turn is pivotally connected at 142 to a link 144. The link 144 is pivotally mounted at 145 on a fixed pivot and is pivotally mounted at 146 on a movable pivot in a slot 148 in the scheduler 58. The pivotal point 146 of the link 144 has a definite location for any particular position of the speed scheduler. For any particular position of the scheduler 58 the link 140 is positionable by link 134 which as stated is movable in accordance with the output of the signal amplifier. Link 134 is slideable on curved rocker arm 150, the link being provided with rollers 152 and 154 which engage opposite surfaces of the member 150. The rocker arm 150 is pivotally connected at 156 to housing structure 158 such that it can move about the pivot point while the rollers 152 and 154 move along the surface of the rocker arm. Opposite ends of the rocker arm include grooves 160 and 162 respectively which serve as tracks for the wheels 164 and 166, the wheels being rotatably mounted in an output member 168. Another pair of wheels 170 and 172 are mounted in the output member 168 to rotate with the member 168 in a plane perpendicular to the axis of rotation of the device, the wheels 170 and 172 having their outer edges disposed in a groove in member 158. Assuming that link 134 is moved so as to pivot member 150 in a clockwise direction as viewed in FIG. 1, the rollers 164 and 166 by reason of their confinement to the grooves 160 and 162 urge output member 168 in a clockwise direction (see FIG. 4). When the member 134 moves so as to pivot rocker arm 150 in a counterclockwise direction the rollers 164 and 166 urge the output member 168 in a counterclockwise direction. The rollers 170 and 172 maintain the member 168 in the same vertical plane while being moved.

In the absence of any phase control signals to the device output member 168 is moved according to the combined effect of the signals generated by the device representing rate of change of speed and instantaneous speed error respectively. The device is, however, preferably adapted to respond to phase control signals representing phase error and the time integral of phase error respectively as well as the speed control signals such that the mechanism may be conveniently used, as for example in a system such as described in the aforementioned patent application of Charles W. Chillson, Serial No. 644,315, filed March 6, 1957, to facilitate phase synchronization of several propellers of a multi-engine aircraft.

Link 174 is provided for actuation by a signal representing integrated phase error, which signal may be used to advantage in a propeller synchronizing system to correct the phase error in a propeller due to a difference in set speed between such propeller and other propellers of an aircraft. As shown, this link pivotally connects at 176 with the link 178, the link 178 being movable about a fixed pivot point 180. The link 178 pivotally connects with the link 44 such that movement of link 174 causes the link 44, acting through rod 40 to adjust the location of pivotal point 38, such adjustment being reflected in the movement of output member 168. A rod 182 is provided for actuation by a signal representing phase error, such signal having application to the correction of phase errors due to transient disturbances. The rod 182 pivotally connects at 184 with the lever 186 which in turn is pivotally connected at 188 with the link 132. The link 132 is mounted for pivotal movement about fixed pivot 192 and is pivotally connected at 130 with the link 128. The link 186 is mounted on a pivotal member 196 contained in a slot 198 in the member 186, and any actuation of the rod 182 causes the member 186 to pivot about pivotal member 196 whereupon the lever 132 moves about pivot 192 to adjust the position of lever 134, the lever 134 in turn being effective to adjust the output member 168.

As shown, the pivotal member 196 is affixed to a member 200 which is pivotally mounted on a fixed pivot at 202. The member 200 includes a pair of fingers which embrace a pin 204 on the rod 20 such that when the rod 20 is moved to the right or left to effect an adjustment in the gain of the rate of change signal, the rod 20 will also be effective by pivoting the member 200 about 202 to alter the position of the pivotal member 196. Movement of the pivot point of link 198 brought about in this way results in a change in the gain of any phase signals which may actuate member 182.

With the device adapted in the described manner to respond to phase control signals representing phase error and integrated phase error, the output of the mechanism may be used to secure both speed and phase synchronization in a propeller synchronizing system. The output signal of the device, as reflected in the movement of member 168, will represent four functions, namely rate of change of speed, instantaneous speed error, phase error, and the time integral of phase error. These functions may be integrated as disclosed in the aforementioned co-pending application in a suitable integrator to obtain a final signal for controlling propeller speed and phase.

As noted, the gain of the term representing the rate of change of speed and the gain of the term representing the phase error is each adjustable in the device by the rod 20. Ideally adjustments should be made according to changing dynamic requirements of the engine being controlled and any engine driven member connected thereto to provide optimum control response, that is according to the damping of these units and according to mass when mass is subject to change. In a propeller control system good results may be achieved by making the aforementioned adjustments in accordance with propeller blade angle, which is a measure of the damping of the propeller and the rod 20 may be connected to propeller pitch changing mechanism for this purpose. The engine damping factor is small by comparison and can, therefore, be neglected. The overall gain of the device is subject to adjustment in accordance with the position of the speed scheduler 52. This adjustment comes about by the positioning of lever 144 as the pivotal member 146 is adjusted in the slot 148 of the member 58. By reason of these various described means for adjusting the gain of the device optimum control response is obtained. This is an important feature of the invention.

Another feature of the invention is directed at the prevention of the overspeeding or underspeeding of the engine being controlled due to a sudden change in the speed setting of the device herein described. Such overspeeding and underspeeding is prevented by the provision of a stop 206 at the upper end of the differential 26. Assuming that the scheduler 58 is suddenly moved to the left for the purpose of bringing about a substantial increase in speed as viewed in FIG. 1 pivot point 38 is caused to move to the right increasing the speed setting of the device. Differential 26 pivots in a clockwise direction about its point of contact on surface 24 with collar 28 until the upper end of the differential engages projection 208 on the stop 206. Any tendency of the scheduler to move the differential further in a clockwise direction due to a continued application of force to it is temporarily resisted. If desired, a spring might be provided to take up the application of force to the scheduler tending to move the differential beyond its point of engagement with the stop. The speed of the engine will begin to increase due to the repositioning of the differential. As speed increases the flyweights 32 will act to pivot the differential in a counterclockwise direction about pivot point 38. The pivot point 38 is however urged to the right by the continued application of force to the scheduler and the differential is thereby maintained in contact for a time with the stop. As speed continues to increase the differential moves away from the stop assuming a position at the desired speed in which the upper end of the differential is spaced from the stop 208. A desirably slow transition from low speed to high speed is obtained in this manner without the danger of overspeeding occurring. Underspeeding due to a sudden repositioning of the scheduler to a position calling for a lower speed is similarly prevented by the engagement of the differential 26 with the projection 210 on the stop 206, such engagement being maintained for a time as the device approaches the desired speed.

While only one embodiment of the invention has been shown it will be understood by those skilled in the art that other embodiments are possible and that various changes and modifications may be made within the scope of the claims without departing from the spirit and scope of the invention.

I claim:

1. A speed control device operable upon rotation, said device comprising a lever pivoted between the ends thereof, first means movable in the device in proportion to rate of change in speed of rotation of the device for positioning the lever in one plane, means for positioning the pivotal axis of the lever in another plane to establish a control speed for the device, means movable according to actual speed for positioning the lever in said another plane about the pivotal axis, signal amplifying means controllable according to the position of the lever in the two planes, a feedback connection from the amplifier to the lever, and output elements positionable in accordance with the operatoin of the amplifier.

2. The speed control device of claim 1 wherein the one and another planes are mutually perpendicular.

3. The speed control device of claim 1 including means for adjusting the proportional relationship between movements of said first means and rate of change of speed.

4. The speed control device of claim 1 including mechanism connected to the output elements for modifying their operation according to a control input signal.

5. The speed control device of claim 1 including additional mechanism connected to the lever for moving the pivotal axis to modify the operation of the output elements according to a control signal.

6. The speed control system of claim 5 including mechanism connected to the output elements for further modifying their operation according to another control signal.

7. The speed control system of claim 4 including adjustable means connected with said first means and said mechanism for simultaneously adjusting the relationship between movements of the first means and rate of change of speed, and modifying the response of the output elements to movements of said mechanism.

8. The speed control system of claim 4 wherein the means for positioning the pivotal axis of the lever includes a speed scheduler, and said control system includes means actuable by the scheduler for orienting the output elements according to the setting of the scheduler.

9. A speed control device operable upon rotation, said device comprising a lever pivoted between the ends thereof, first means movable in the device in proportion to rate of change in speed of rotation of the device for positioning the lever in one plane, means for positioning the pivotal axis of the lever in another plane to establish a control speed for the device, means movable according to actual speed for positioning the lever in said another plane about the pivotal axis, means for limiting movement of the lever in said another plane about the pivotal axis, signal amplifying means controlled according to the position of the lever in the two planes, a feedback connection from the amplifier to the lever, and output elements positionable in accordance with the operation of the amplifier.

References Cited in the file of this patent

UNITED STATES PATENTS

| | | |
|---|---|---|
| 2,301,434 | McNeil | Nov. 10, 1942 |
| 2,442,389 | Weiss | June 1, 1948 |
| 2,593,484 | Philpott | Apr. 22, 1952 |
| 2,667,344 | Robbins | Jan. 26, 1954 |
| 2,669,312 | Dinsmore et al. | Feb. 16, 1954 |
| 2,724,282 | Blattman | Nov. 22, 1955 |
| 2,755,680 | Widmer | July 24, 1956 |
| 2,847,617 | Clark | Aug. 12, 1958 |
| 2,877,854 | Brahm | Mar. 17, 1959 |
| 2,877,855 | Farkas | Mar. 17, 1959 |